(12) United States Patent
Pettersson (10) Patent No.: US 11,046,303 B2
(45) Date of Patent: Jun. 29, 2021

(54) METHODS AND SYSTEM FOR STARTING A HYBRID VEHICLE

(71) Applicant: Ford Global Technologies, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 16/351,069

(22) Filed: Mar. 12, 2019

(65) Prior Publication Data

US 2020/0290594 A1    Sep. 17, 2020

(51) Int. Cl.
| | |
|---|---|
| *B60W 20/40* | (2016.01) |
| *B60K 6/50* | (2007.10) |
| *F02D 43/04* | (2006.01) |
| *B60W 20/00* | (2016.01) |
| *H02P 17/00* | (2006.01) |
| *B60K 6/26* | (2007.10) |
| *B60W 10/06* | (2006.01) |
| *B60W 10/08* | (2006.01) |
| *B60W 10/101* | (2012.01) |
| *B60W 10/11* | (2012.01) |
| *B60W 10/02* | (2006.01) |
| *B60K 6/48* | (2007.10) |

(52) U.S. Cl.
CPC ............... *B60W 20/40* (2013.01); *B60K 6/26* (2013.01); *B60K 6/48* (2013.01); *B60W 10/023* (2013.01); *B60W 10/06* (2013.01); *B60W 10/08* (2013.01); *B60W 10/101* (2013.01); *B60W 10/11* (2013.01); *B60K 2006/268* (2013.01); *B60K 2006/4816* (2013.01); *B60K 2006/4841* (2013.01); *B60W 2710/0644* (2013.01); *B60W 2710/081* (2013.01); *B60W 2710/1005* (2013.01); *B60Y 2200/92* (2013.01)

(58) Field of Classification Search
CPC ...... B60W 20/40; B60W 20/00; B60W 20/30; B60K 6/50; F02D 43/04; H02P 17/00
See application file for complete search history.

(56) References Cited

U.S. PATENT DOCUMENTS

| | | | |
|---|---|---|---|
| 2008/0090697 A1* | 4/2008 | Ortmann | ............... B60W 10/10 477/15 |
| 2013/0297191 A1* | 11/2013 | Gibson | ..................... F02D 9/02 701/112 |
| 2015/0112524 A1 | 4/2015 | Wang et al. | |
| 2016/0031428 A1* | 2/2016 | Sun | ........................ B60W 20/13 701/22 |
| 2016/0046278 A1* | 2/2016 | Matsuzaki | .......... B60W 10/103 701/22 |
| 2016/0304085 A1* | 10/2016 | Nefcy | ................... B60W 20/30 |
| 2018/0015817 A1* | 1/2018 | Samie | ................. F16H 57/0457 |
| 2018/0215249 A1 | 8/2018 | Duan et al. | |

* cited by examiner

*Primary Examiner* — Yuri Kan
(74) *Attorney, Agent, or Firm* — David Kelley; McCoy Russell LLP (57) ABSTRACT

Systems and methods for operating a vehicle that includes an engine and an integrated starter/generator are described. In one example, a torque output of an electric machine is increased via a rotation ratio changing device to reduce engine noise and vibration during engine starting. After the engine is started, the rotation ratio changing device is adjusted so that the engine and the electric machine rotate at a same speed.

16 Claims, 6 Drawing Sheets

METHODS AND SYSTEM FOR STARTING A HYBRID VEHICLE

FIELD

The present description relates to methods and a system for a hybrid vehicle that includes an integrated starter/generator for propelling a vehicle and starting an engine.

BACKGROUND AND SUMMARY

A hybrid vehicle may include a low voltage engine starter and an integrated starter generator. The low voltage engine starter has a sole function of cranking and rotating the engine during engine starting. The integrated starter/generator may provide propulsive force to the vehicle driveline and it may also regenerate the vehicle's kinetic energy into electrical energy that may be stored onboard the vehicle. The integrated starter/generator may also be applied to start the engine, but cranking the engine via the integrated starter/generator may increase driveline noise and vibration. Including both the low voltage starter and the integrated starter/generator increases system cost and weight. Therefore, it may be desirable to remove the low voltage starter from the vehicle; however, to remove the low voltage starter from the system, it may be desirable to find a way of reducing driveline noise and vibration when the integrated starter/generator is applied to start the engine.

The inventors herein have recognized the above-mentioned issues and have developed a powertrain operating method, comprising: rotating an engine via an electric machine directly coupled to a rotation ratio changing device, the rotation ratio changing device positioned in a driveline between the engine and the electric machine; and adjusting a ratio of electric machine rotations to engine rotations via the rotation ratio changing device while the engine is running after starting the engine.

By adjusting a ratio of a rotation ratio changing device that is positioned in a driveline between an engine and an electric machine, it may be possible to provide the technical result of reducing driveline noise and vibration during engine cranking via the electric machine. In particular, the ratio of the rotation ratio changing device may be adjusted to decrease a number of engine rotations relative to electric machine rotations so that a higher torque may be applied to the engine via the electric machine. The higher torque may help to reduce engine cranking vibration and noise. Further, it may be possible to start the engine with a smaller electric machine so that system cost may be reduced.

The present description may provide several advantages. In particular, the approach may improve engine starting via an integrated starter/generator. Further, the approach may reduce system cost by starting an engine via an integrated starter/generator and without a starter motor. In addition, the approach may reduce driveline noise and vibration when the engine is cranked via an integrated starter/generator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
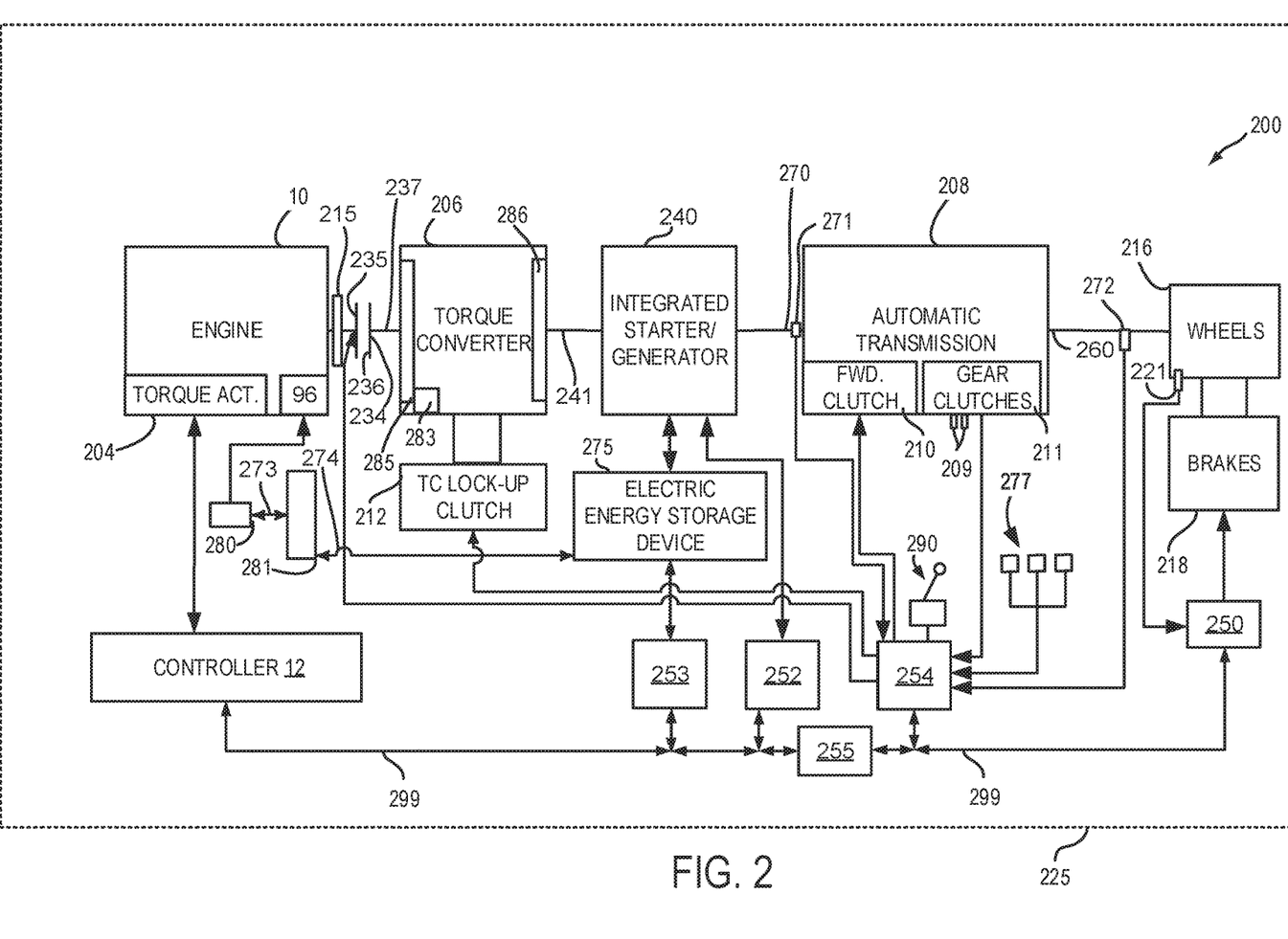
FIG. 2 is a schematic diagram of a first vehicle driveline.
Figure 3:
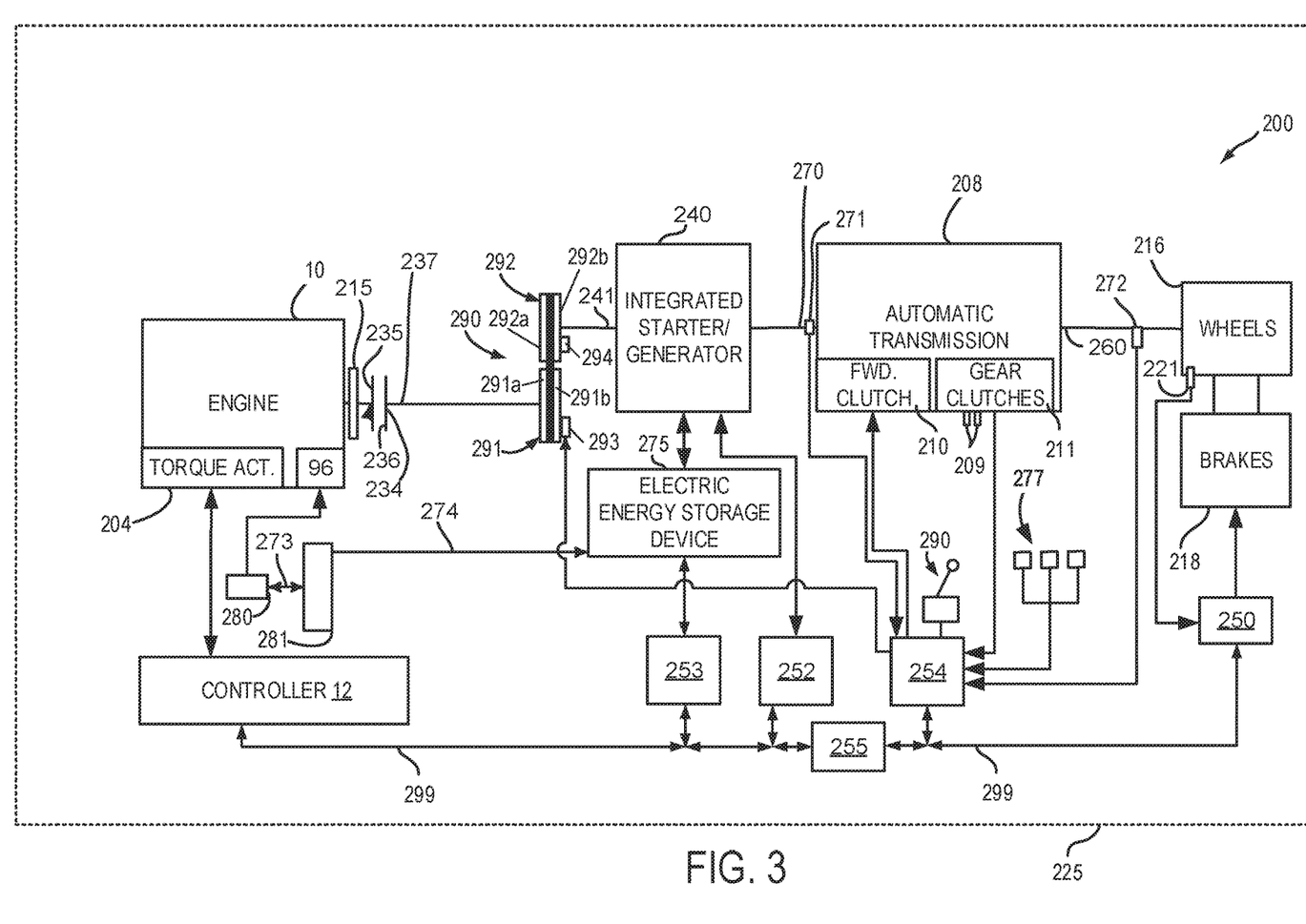
FIG. 3 is a schematic diagram of a second vehicle driveline.

The present description is related to operating a hybrid vehicle that includes an engine that may be automatically stopped (e.g., the engine may be stopped in response to vehicle operating conditions via a controller without a human or autonomous driver specifically requesting an engine stop via a dedicated input that has sole function(s) for stopping and starting the engine, such as a pushbutton or key switch) and automatically started (e.g., the engine may be started in response to vehicle operating conditions via a controller without a human or autonomous driver specifically requesting an engine start via a dedicated input that has sole function(s) for stopping and starting the engine, such as a pushbutton or key switch). The approach includes changing a ratio of a rotational ratio changing device to improve engine cranking and starting. The engine may be of the type shown in FIG. 1. The engine may be included in a driveline as shown in FIGS. 2 and 3. The vehicle may operate according to the sequence of FIG. 4. The vehicle may be operated according to the method of FIG. 5 to reduce the possibility of driveline noise and vibration during engine cranking for engine starting. The engine may be cranked via an ISG providing torque as shown in FIGS. 6A and 6B.

Figure 1:
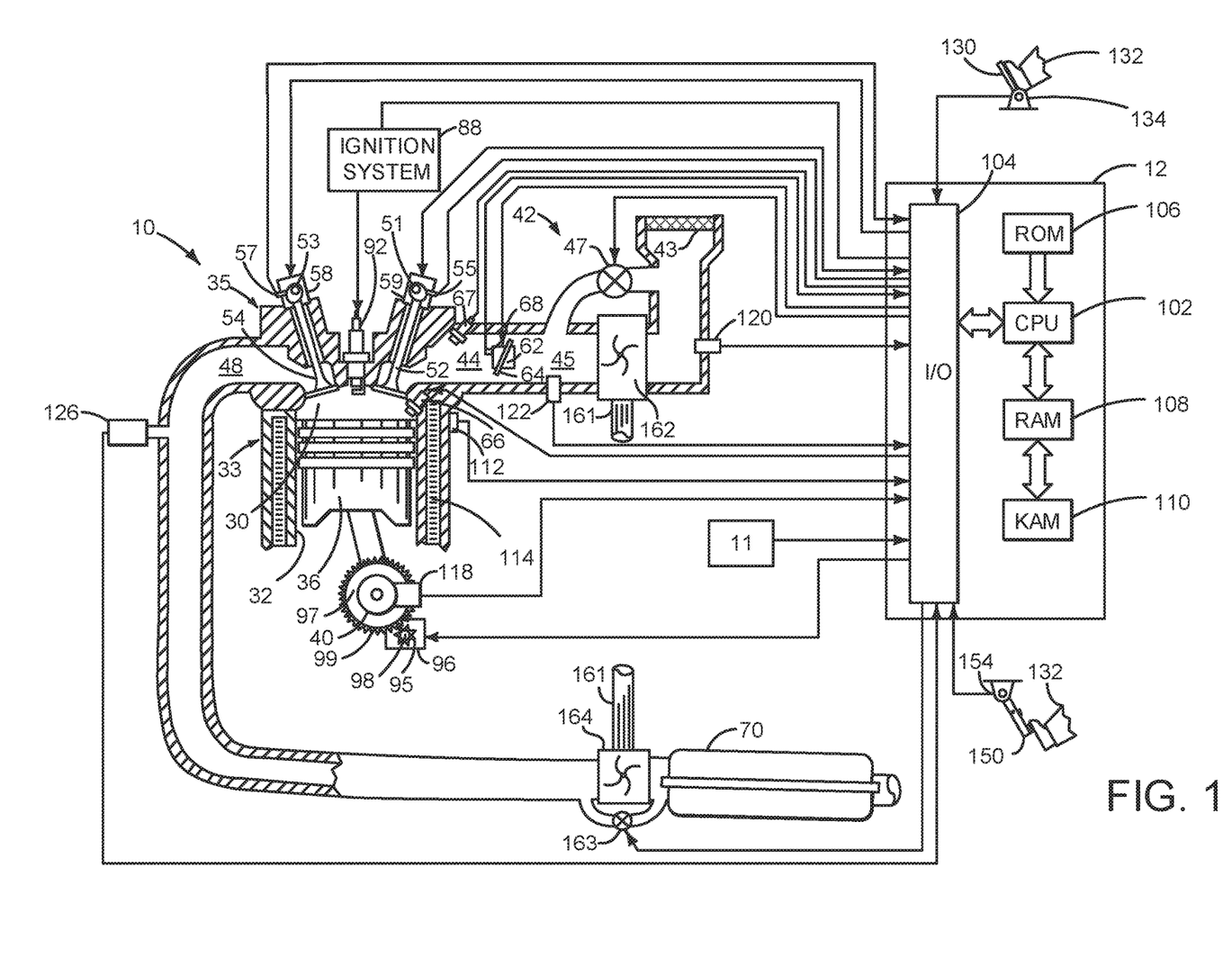
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3. The controller employs the actuators shown in FIGS. 1-3 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and/or electric machine 240. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the engine power that flows through torque converter 206 and ISG power is less than a transmission input power limit (e.g., a threshold value not to be exceeded), the power is delivered to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255.

Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, a block diagram of an alternative driveline is shown. The driveline shown in FIG. 3 includes many of the components shown in the driveline of FIG. 2. Accordingly, driveline components that are shared between the two drivelines share the same numeric identifiers and operate as described in FIG. 2. Therefore, for the sake of brevity the description of equivalent driveline components is omitted. For example, engine 10 and automatic transmission 208 shown in FIGS. 2 and 3 are equivalent and operate in a similar manner. Driveline components that are unique to FIG. 3 are described in the description of FIG. 3.

Figure 4:
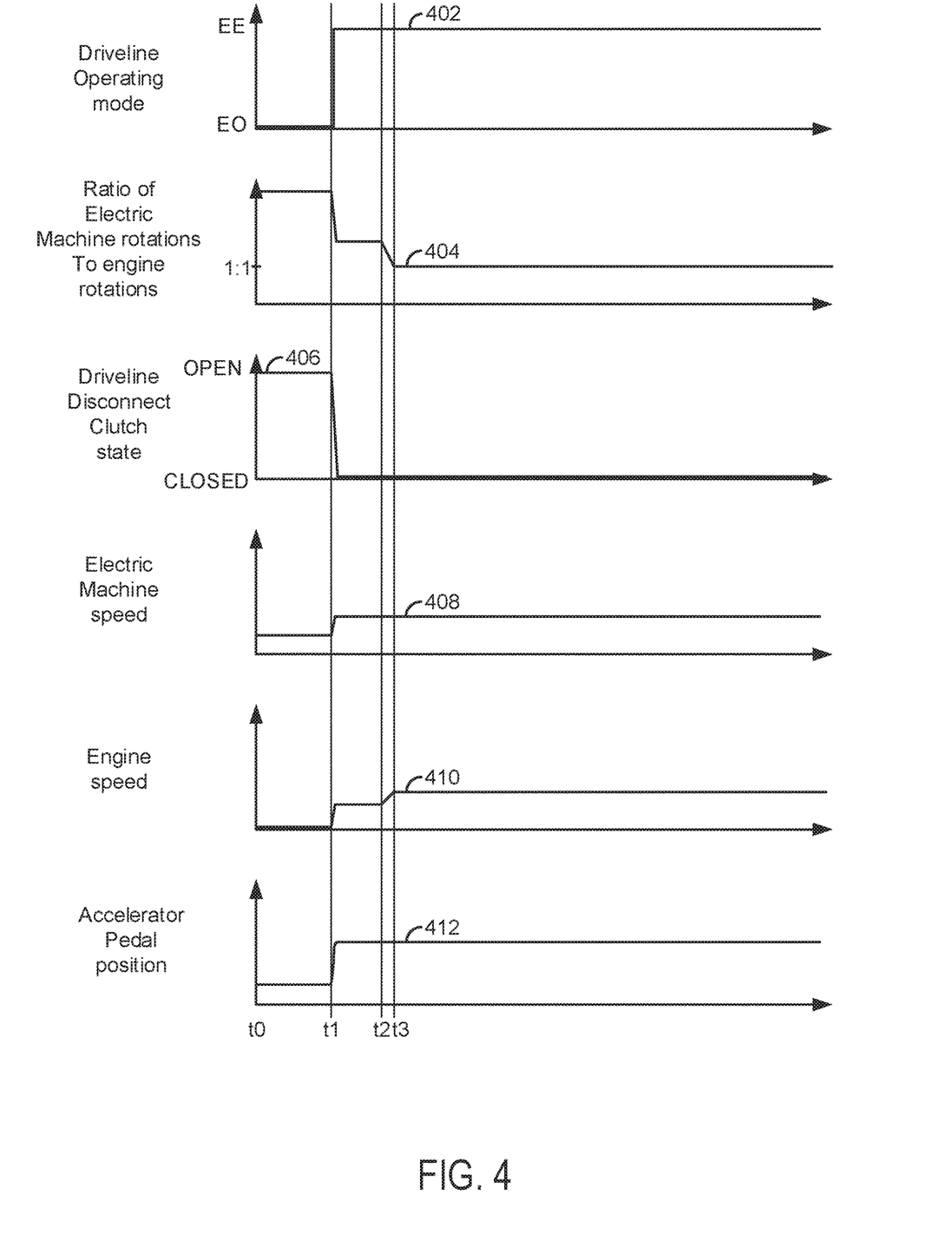
FIG. 4 shows an example engine starting sequence according to the method of FIG. 5.
Figure 5:
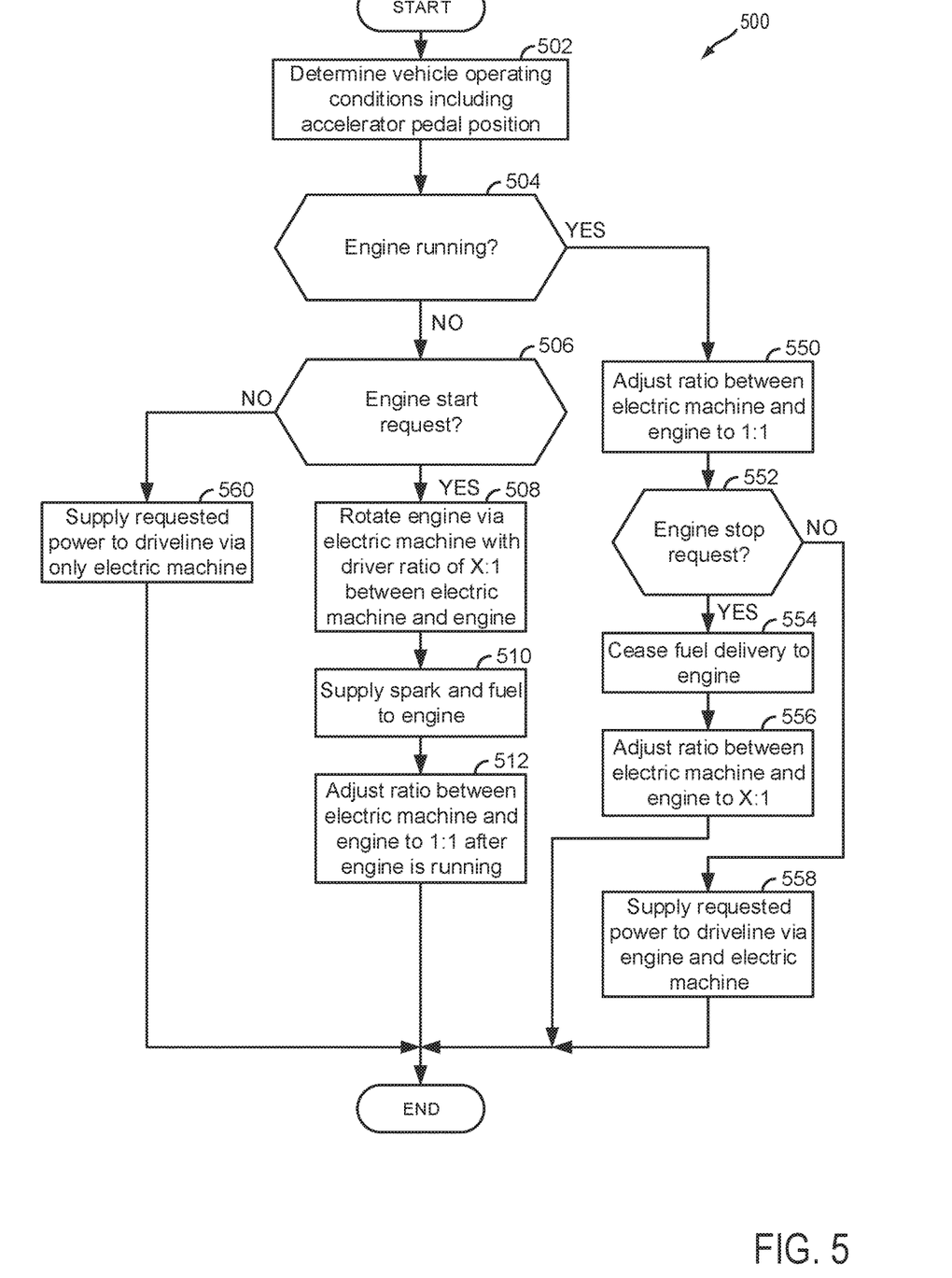
FIG. 5 shows a method for operating a driveline and starting an engine.
Figure 6A:
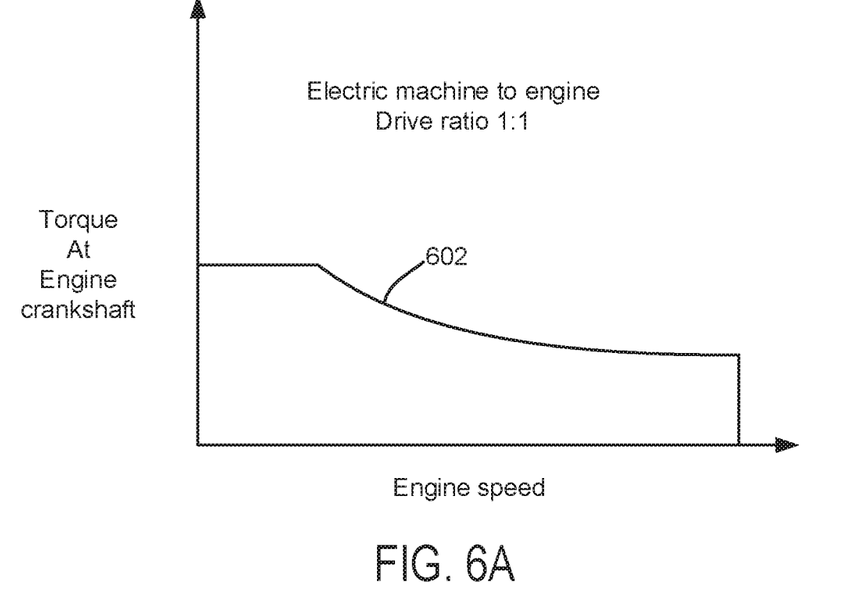
FIGS. 6A and 6B show engine cranking torques via an ISG.
Figure 6B:
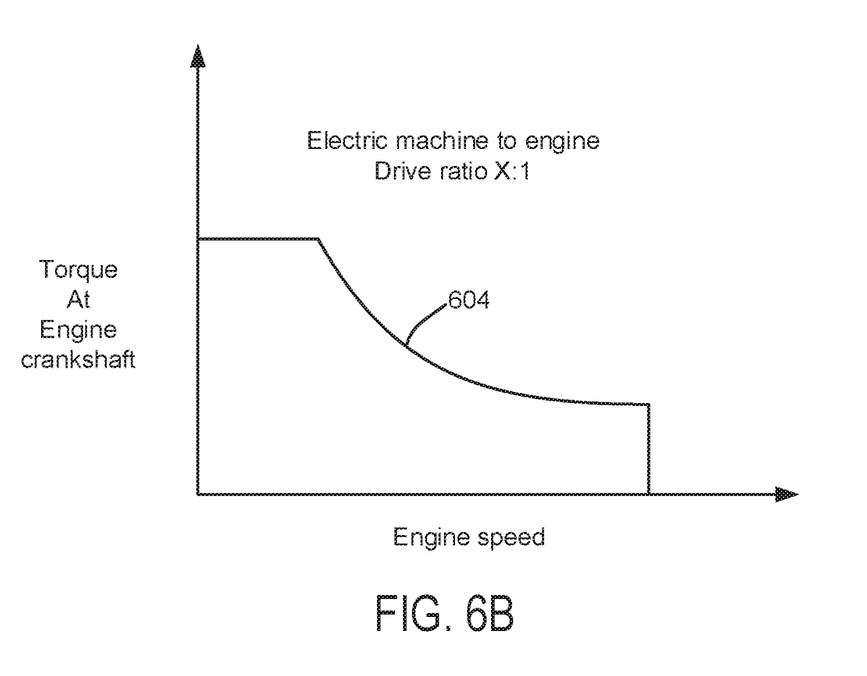

Referring now to FIG. 4, plots of a prophetic vehicle operating sequence according to the method of FIG. 5 and the systems of FIGS. 1-3 are shown. The plots are aligned in time and occur at a same time. The vertical lines at t0-t3 show particular times of interest.

The first plot from the top of FIG. 4 is a plot of driveline operating mode versus time. The vertical axis represents the driveline operating mode. The driveline operating mode may be electric machine only (EO), where the ISG 240 solely provides propulsive effort for the vehicle, or electric machine and engine (EE) mode, where only engine 10, or engine 10 and ISG 240, provide propulsive effort for the vehicle as indicated along the vertical axis. The horizontal axis represents time and the time increases from the left side of the figure to the right side of the figure. Trace 402 represents the driveline operating mode.

The second plot from the top of FIG. 4 is a plot ratio of electric machine rotations to engine rotations versus time. The vertical axis represents the ratio of electric machine rotations to engine rotations. The horizontal axis represents time and the time increases from the left side of the figure to the right side of the figure. Trace 404 represents the ratio of electric machine rotations to engine rotations.

The third plot from the top of FIG. 4 is a plot of driveline disconnect clutch operating state versus time. The vertical axis represents driveline disconnect clutch operating state and the driveline disconnect clutch is fully open when trace 406 is at a higher level near the vertical axis arrow. The driveline disconnect clutch is fully closed when trace 406 is at a lower level near the horizontal axis. The horizontal axis represents time and the time increases from the left side of the figure to the right side of the figure. Trace 406 represents the driveline disconnect clutch operating state.

The fourth plot from the top of FIG. 4 is a plot of electric machine (ISG 240) speed versus time. The vertical axis represents electric machine speed and electric machine speed increases in the direction of the vertical axis arrow. The horizontal axis represents time and the time increases from the left side of the figure to the right side of the figure. Trace 408 represents the electric machine speed.

The fifth plot from the top of FIG. 4 is a plot of engine speed versus time. The vertical axis represents engine speed and engine speed increases in the direction of the vertical axis arrow. The horizontal axis represents time and the time increases from the left side of the figure to the right side of the figure. Trace 410 represents the engine speed.

The sixth plot from the top of FIG. 4 is a plot of accelerator pedal position versus time. The vertical axis represents accelerator pedal position and the accelerator pedal position indicates that the accelerator pedal is applied further in the direction of the vertical axis arrow. The horizontal axis represents time and time increases from the left side of the figure to the right side of the figure. Trace 412 represents the accelerator pedal position.

At time t0, the vehicle is operating in electric machine only mode and the engine is stopped (e.g., the crankshaft is not rotating and the engine is not combusting fuel). The ratio of electric machine rotations to engine rotations is high since the electric machine is propelling the vehicle and the engine is stopped. The driveline disconnect clutch is fully open and the electric machine speed is a lower speed. The accelerator pedal position is a lower position.

At time t1, the driver (not shown) applies the accelerator pedal, thereby increasing the driver requested powertrain power amount (not shown). The increased driver requested powertrain power causes a change in the driveline mode from electric machine only mode to electric machine and engine mode so that the driver requested powertrain power may be met. The driveline mode change generates an engine start request (not shown). The driveline disconnect clutch is fully closed in response to the driveline mode change and the electric machine power output is increased to meet the increased driver requested powertrain power (not shown). The engine speed increases in response to the driveline disconnect clutch closing and the increase in driver requested powertrain power. The ratio of electric machine rotations to engine rotations is reduced as the engine starts rotating.

Between time t1 and time t2, the engine rotates at a rate that is slower than the electric machine as a ratio of a rotation ratio changing device is adjusted to a predetermined ratio for engine cranking (e.g., rotating the engine under power of an electric machine) and starting. In one example, the rotation ratio changing device is a CVT and a ratio of the CVT is adjusted to increase torque provided by ISG 240 to engine 10 via adjusting a pulley ratio of the CVT. In another example, the rotation ratio changing device is a torque converter and a torque converter clutch is fully opened to increase torque provided by ISG 240 to engine 10. The driveline is in electric machine and engine mode and the ratio of electric machine rotations to engine rotations is greater than 1:1. The driveline disconnect clutch is fully opened and the electric machine speed is operating at a higher speed than at time t0. The engine speed is a cranking speed and the accelerator pedal position is maintained at a middle higher level.

At time t2, the engine starts while the driveline is operating in the electric machine and engine mode. The engine speed begins to increase and the ratio of electric machine rotations to engine rotations is reduced further. The driveline disconnect clutch is fully closed and the electric machine speed is unchanged. The accelerator pedal position is unchanged.

Between time t2 and time t3, the engine speed accelerates to the speed of the electric machine as the ratio of the rotation ratio changing device is reduced from greater than 1:1 to 1:1. The driveline disconnect clutch remains fully closed and the speed of the electric machine remains constant. The accelerator pedal position remains unchanged.

At time t3, the ratio of the rotational ratio changing device is reduced to 1:1 and the engine speed matches the electric machine speed. The driveline disconnect clutch remains fully closed and the driveline remains in electric machine and engine mode. The accelerator pedal position remains unchanged.

In this way, a torque of an electric machine may be increased to crank an engine during engine starting so that driveline noise and vibration may be reduced. Further, by increasing electric machine torque during engine cranking, it may be possible to configure the driveline with a lower capacity ISG so that system cost may be reduced. The rotation ratio changing device may change a rotation ratio between an engine and the electric machine during engine cranking and after engine cranking to meet engine cranking objectives.

Referring now to FIG. 5, a flow chart of a method for operating a vehicle in a way that reduces a possibility of driveline noise and vibration during engine cranking via an ISG is shown. The method of FIG. 5 may be incorporated into and may cooperate with the system of FIGS. 1-3. Further, at least portions of the method of FIG. 5 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to powertrain speed (e.g., speed of ISG 240 or input speed to a torque converter, or alternatively, speed of a transmission input shaft), engine speed, engine temperature, electric energy storage device state of charge (SOC), accelerator pedal position, and driver requested powertrain power amount. Method 500 proceeds to 504.

At 504, method 500 judges if the engine is running (e.g., crankshaft is rotating and the engine is combusting fuel). Method may judge that the engine is running if fuel is being delivered to the engine and the engine is rotating above an engine cranking speed. If method 500 judges that the engine is running, the answer is yes and method 500 proceeds to 550. Otherwise, the answer is no and method 500 proceeds to 506.

At 550, method 500 adjusts a rotation ratio between an electric machine in the driveline (e.g., ISG 240) and the engine to 1:1. In one example, the rotation ratio may be adjusted via adjusting a pulley ratio of a CVT so that the engine rotates once for each electric machine rotation. In another example, a torque converter clutch of a torque converter may be fully locked so that the engine rotates once for each electric machine rotation. Method 500 proceeds to 552.

At 552, method 500 judges if an engine stop is requested. An engine stop may be requested by a driver requesting an engine stop via a push button or key switch. Alternatively, a controller may automatically request an engine stop responsive to vehicle operating conditions (e.g., driver demand powertrain power and vehicle speed). If method 500 judges that an engine stop is requested, the answer is yes and method 500 proceeds to 554. Otherwise, the answer is no and method 500 proceeds to 558.

At 558, method 500 supplies the driver requested powertrain power amount via the engine or the engine and the electric machine. In one example, method 500 partitions the driver requested powertrain power amount into an engine power and an electric machine power. The engine is commanded to provide a first portion of the driver requested power via adjusting a throttle opening amount, fuel injection timing, spark timing, and cam timing. The electric machine (e.g., ISG 240) is commanded to provide a second portion of the driver requested power via adjusting an amount of electric current flow to the ISG. The engine power plus the ISG power is equal to the driver requested powertrain power. Method 500 proceeds to exit.

At 554, method 500 ceases injecting fuel to the engine. Method 500 may also cease spark delivery to the engine. The engine ceases combusting fuel and stops rotating. The driveline disconnect clutch may be opened during conditions when the electric machine continues to propel the vehicle. Method 500 proceeds to 556.

At 556, method 500 adjusts a ratio of rotations between the electric machine and the engine. The ratio of rotations may be adjusted via adjusting an operating state of the rotation ratio changing device. In one example, the ratio of electric machine rotations to engine rotations is increased via unlocking a torque converter clutch of a torque converter. In another example, the ratio or electric machine rotations to engine rotations is increased via changing a pulley ratio between the electric machine and the engine. For example, the ratio of electric machine rotations to engine rotations may be increased from 1:1 to 1.5:1. In another example, the ratio of electric machine rotations to engine rotations may be increased from 1:1 to 2:1. The increase in electric machine rotations to engine rotations may prepare the engine for cranking via the electric machine so that the amount of torque delivered from the electric machine to the engine during cranking may be increased. Method 500 proceeds to exit.

At 506, method 500 judges if an engine start is requested. An engine start may be requested when a driver demand powertrain power exceeds a threshold power or when a battery state of charge (SOC) is less than a threshold state of charge. If method 500 requests an engine start, the answer is yes and method 500 proceeds to 508. Otherwise, the answer is no and method 500 proceeds to 560.

At 560, method 500 supplies the driver requested powertrain power amount solely via the electric machine. The electric machine (e.g., ISG 240) is commanded to provide driver requested power via adjusting an amount of electric current flow to the ISG. Method 500 proceeds to exit.

At 508, method 500 rotates the engine via the electric machine (e.g., ISG 240) with a rotational rate between the electric machine and the engine of X:1 (may also be referred to as a rotation or rotational ratio), where X is greater than one. For example, the electric machine may rotate 1.5 times for each engine rotation so that the amount of torque that is delivered from the electric machine to the ISG is greater than the output torque of the ISG. By increasing the amount of torque that is delivered to the engine during engine starting, it may be possible to reduce driveline noise and vibration. The ratio of rotations of the electric machine to the engine may be adjusted via the rotation ratio changing device. In one example, a torque converter clutch is unlocked to adjust the ratio of the rotation ratio changing device. In another example, a pulley ratio is adjusted to change the ratio of the rotation ratio changing device. The electric machine may be propelling the vehicle while rotating the engine. Method 500 proceeds to 510.

At 510, method 500 supplies spark and fuel to the engine. Method 500 proceeds to 512 after the engine begins combustion.

At 512, method 500 adjusts the rotational ratio between the electric machine and the engine to 1:1 after the engine begins to combust fuel and begins to run. In one example, method 500 adjusts a ratio of the rotation ratio changing device to 1:1 via locking a torque converter clutch. In another example, method 500 adjusts a ratio of the rotation ratio changing device to 1:1 via a pulley ratio of the rotation ratio changing device. Method 500 also supplies the driver requested powertrain power amount via the electric machine and the engine as described at 558. Thus, the engine and the electric machine may be rotated at engine idle speed or above engine idle speed. Method 500 proceeds to exit.

In this way, a greater amount of torque may be provided by an electric machine to an engine during engine cranking. The larger torque amount may help to reduce driveline noise and vibration. Further, size of the electric machine may be kept smaller to reduce system cost.

Thus, the method of FIG. 5 provides for a powertrain operating method, comprising: rotating an engine via an electric machine directly coupled to a rotation ratio changing device, the rotation ratio changing device positioned in a driveline between the engine and the electric machine; and adjusting a ratio of electric machine rotations to engine rotations via the speed ratio changing device while the engine is running after starting the engine. The method includes where the electric machine is directly coupled to a step ratio transmission. The method includes where the rotation ratio changing device is directly coupled to a driveline disconnect clutch. The method includes where the rotation ratio changing device is a continuously variable transmission. The method includes where the rotation ratio changing device is a torque converter. The method further comprises rotating the engine via the electric machine in response to a request to start the engine. The method further comprises generating electric power via the electric machine and storing the electric power in an electric energy storage device. The method includes where the ratio of electric machine rotations to engine rotations is adjusted to a ratio of 1:1 while the engine is running after starting the engine.

The method of FIG. 5 also provides for a powertrain operating method, comprising: rotating an engine via an electric machine during engine cranking, the engine rotated at a first speed and the electric machine rotated at a second speed during engine cranking; and rotating the engine at a third speed and rotating the electric machine at the third speed after starting the engine. The method includes where the first speed is less than the second speed, the third speed an engine idle speed or greater than the engine idle speed. The method includes where the third speed is greater than the second speed. The method further comprises rotating the engine at the first speed and the electric machine at the second speed in response to a request to start the engine. The method further comprises propelling a vehicle via the electric machine while rotating the engine via the electric machine. The method includes where the engine is rotated via the electric machine via a rotation ratio changing device.

In another representation, the method of FIG. 5 provides for a powertrain operating method, comprising: rotating an engine via an electric machine and a fluidic coupling device that includes a lockup clutch during engine cranking, the engine rotated at a first speed and the electric machine rotated at a second speed during engine cranking; and rotating the engine at a third speed and rotating the electric machine at the third speed after starting the engine via closing the lockup clutch. The method includes where the first speed is less than the second speed. The method includes where the third speed is greater than the second speed. The method further comprises rotating the engine at the first speed and the electric machine at the second speed in response to a request to start the engine.

Referring now to FIG. 6A, a first plot that shows torque at an engine crankshaft when rotating an engine via an ISG with an electric machine rotation ratio to engine rotation ratio of 1:1 is shown. The scale of the plot in FIG. 6A is the same scale as the plot in FIG. 6B. Further, the ISG applied to generate curve 602 in FIG. 6A is the same ISG applied to generate curve 604 in FIG. 6A. It may be observed that the torque at the engine crankshaft in FIG. 6A is a middle level for lower engine speeds and a lower torque for higher engine speeds. The maximum engine speed in FIG. 6A is a higher engine speed. The electric machine rotation ratio to engine rotation ratio of 1:1 may be provided when the electric machine is directly coupled to the engine.

Referring now to FIG. 6B, a first plot that shows torque at an engine crankshaft when rotating an engine via an ISG with an electric machine rotation ratio to engine rotation ratio of X:1 is shown, where X is a value greater than one. It may be observed that the torque at the engine crankshaft in FIG. 6B is a higher level for lower engine speeds and a higher torque for middle engine speeds as compared to what is shown in FIG. 6A. The maximum engine speed in FIG. 6B is a lower engine speed because the rotation ratio is X:1 rather than 1:1. The electric machine rotation ratio to engine rotation ratio of X:1 may be provided when a rotation ratio changing device is positioned in a driveline between the engine and the electric machine electric machine. Thus, the rotation ratio changing device may increase the amount of torque provided by the electric machine to the engine crankshaft during engine cranking. However, the engine crankshaft may not be rotated at as high as speeds when the rotation ratio changing device is providing a rotation ratio of X:1. Rotating the engine with a greater torque may reduce driveline noise and vibration during engine cranking.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, comprising:
rotating an engine via an electric machine directly coupled to a rotation ratio changing device, the rotation ratio changing device positioned in a driveline between the engine and the electric machine; and
adjusting a ratio of electric machine rotations to engine rotations via the rotation ratio changing device while the engine is running after starting the engine.

2. The method of claim 1, where the electric machine is directly coupled to a fixed ratio transmission.

3. The method of claim 2, where the rotation ratio changing device is directly coupled to a driveline disconnect clutch.

4. The method of claim 1, where the rotation ratio changing device is a torque converter.

5. The method of claim 1, further comprising rotating the engine via the electric machine in response to a request to start the engine.

6. The method of claim 1, further comprising generating electric power via the electric machine and storing the electric power in an electric energy storage device.

7. The method of claim 1, where the ratio of electric machine rotations to engine rotations is adjusted to a ratio of 1:1 while the engine is running after starting the engine.

8. A powertrain operating method, comprising:
rotating an engine via an electric machine during engine cranking, the engine rotated at a first speed and the electric machine rotated at a second speed during engine cranking; and
rotating the engine at a third speed and rotating the electric machine at the third speed after starting the engine, the third speed an engine idle speed or greater than the engine idle speed.

9. The method of claim 8, where the first speed is less than the second speed.

10. The method of claim 9, where the third speed is greater than the second speed.

11. The method of claim 8, further comprising rotating the engine at the first speed and the electric machine at the second speed in response to a request to start the engine.

12. The method of claim 8, further comprising propelling a vehicle via the electric machine while rotating the engine via the electric machine.

13. The method of claim 8, where the engine is rotated via the electric machine via a rotation ratio changing device.

14. A system, comprising:
an engine in a hybrid vehicle driveline;
an electric machine in the hybrid driveline;
a rotation ratio changing device positioned in a driveline between the engine and the electric machine; and
a controller including executable instructions stored in non-transitory memory to rotate the engine via the electric machine and change a rotation ratio of the rotation ratio changing device such that the electric machine rotates the engine at a lower speed than a speed of the electric machine via rotating the rotation ratio changing device in response to an engine start request.

15. The system of claim 14, further comprising additional instructions to rotate the engine at the speed of the electric machine after the engine is running.

16. The system of claim 14, where the rotation ratio changing device is a torque converter.

* * * * *